(12) United States Patent
Wiebe et al.

(10) Patent No.: US 7,130,264 B2
(45) Date of Patent: Oct. 31, 2006

(54) SERVICE PROTECTION METHOD AND APPARATUS FOR TDM OR WDM COMMUNICATIONS NETWORKS

(75) Inventors: Marvin Jake Wiebe, Stittsville (CA); Phuong Lethebinh, Kanata (CA); Stephen Kieran Anthony Adolph, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 850 days.

(21) Appl. No.: 10/034,443

(22) Filed: Dec. 26, 2001

(65) Prior Publication Data

US 2003/0117951 A1 Jun. 26, 2003

(51) Int. Cl.
*H04J 1/16* (2006.01)
(52) U.S. Cl. ............ 370/225; 370/468; 370/907; 398/5; 398/7
(58) Field of Classification Search ............ 370/440, 370/442, 430, 225, 468, 228, 227, 224, 907; 398/5, 7, 14, 34, 45
See application file for complete search history.

(56) References Cited

U.S. PATENT DOCUMENTS 5,881,050 A 3/1999 Chevalier et al.
5,903,370 A 5/1999 Johnson

FOREIGN PATENT DOCUMENTS

| EP | 1 014 611 A2 | 5/1999 |
| EP | 1 009 191 A2 | 6/2000 |
| EP | 1 330 060 A3 | 12/2002 |
| EP | 1 330 060 A2 | 12/2003 |
| WO | WO 00/74310 | * 7/2000 |
| WO | WO 00/74310 A2 | 12/2000 |
| WO | WO 01/76113 A1 | 10/2001 |

* cited by examiner

*Primary Examiner*—Chi Pham
*Assistant Examiner*—Alexander O. Boakye
(74) *Attorney, Agent, or Firm*—Dougherty Clements; Christopher L. Bernard; Tyler S. Brown

(57) ABSTRACT

Service path protection is provided for packet-based data services (e.g. GbE or FC) by making available to a protected service, as and when needed, preemptable (i.e. sharable) transport bandwidth (e.g. STS-1s for a SONET network) used, under normal conditions, to transport other data services. Each client-based service path is defined by a selectable working path when service protection has not been initiated for that service path and each working path comprises a selectable bandwidth, selectable portions of which are designated as unpreemptable and/or preemptable, whereby the preemptable bandwidth portions are made available for protection preemption by different service paths. A protection path is assigned to each protected service path, whereby each protection path comprises a selectable bandwidth having preemptable bandwidth portion(s) of working path(s) defining different service path(s) and/or unused network bandwidth. In response to a protection switch request the protected service path is switched so that it is defined by the protection path assigned to it, thereby preempting the preemptable bandwidth portion of the protection path for use by the protected service path. The working path bandwidths are selected on a dynamic basis in response to available network bandwidth so as to maximize the use of network bandwidth by the working paths.

19 Claims, 6 Drawing Sheets

| FRAME # | UNPREEMPTABLE | PREEMPTABLE | PROTECTED | BW ALLOCATION |
|---|---|---|---|---|
| 1 | 1 | - | - | 1 |
| 2 | 1 | - | - | 1 |
| 3 | 1 | - | - | 1 |
| 4 | - | 1 | 3 | 1 |
| 5 | - | 1 | 3 | 1 |
| 6 | - | 1 | 3 | 1 |
| 7 | 2 | - | - | 2 |
| 8 | 2 | - | - | 2 |
| 9 | 2 | - | - | 2 |
| 10 | - | 2 | 4 | 2 |
| 11 | - | 2 | 4 | 2 |
| 12 | - | 2 | 4 | 2 |

FIG. 1B

| FRAME # | UNPREEMPTABLE | PREEMPTABLE | PROTECTED | BW ALLOCATION |
|---|---|---|---|---|
| 1 | 3 | - | - | 3 |
| 2 | 3 | - | - | 3 |
| 3 | 3 | - | - | 3 |
| 4 | - | 3 | 1 | 3 |
| 5 | - | 3 | 1 | 3 |
| 6 | - | 3 | 1 | 3 |
| 7 | 4 | - | - | 4 |
| 8 | 4 | - | - | 4 |
| 9 | 4 | - | - | 4 |
| 10 | - | 4 | 2 | 4 |
| 11 | - | 4 | 2 | 4 |
| 12 | - | 4 | 2 | 4 |

FIG. 1C

| FRAME # | UNPREEMPTABLE | PREEMPTABLE | PROTECTED | BW ALLOCATION |
|---|---|---|---|---|
| 1 | 3 | - | - | 3 |
| 2 | 3 | - | - | 3 |
| 3 | 3 | - | - | 3 |
| 4 | - | 3 | 1 | 1 |
| 5 | - | 3 | 1 | 1 |
| 6 | - | 3 | 1 | 1 |
| 7 | 4 | - | - | 4 |
| 8 | 4 | - | - | 4 |
| 9 | 4 | - | - | 4 |
| 10 | - | 4 | 2 | 2 |
| 11 | - | 4 | 2 | 2 |
| 12 | - | 4 | 2 | 2 |

FIG. 2B

SERVICE PROTECTION METHOD AND APPARATUS FOR TDM OR WDM COMMUNICATIONS NETWORKS

FIELD OF THE INVENTION

This invention relates to a method and apparatus for providing service protection to a TDM (time division multiplexed) or WDM (wavelength division multiplexed) communications transport network (such as a synchronous optical network (SONET)) on a flexible, service path basis.

BACKGROUND OF THE INVENTION

Currently, wide area networks (WANs) are primarily structured for a point-to-point delivery of bandwidth in the form of static 'pipes' using TDM e.g. SONET (synchronous optical network)/SDH (synchronous digital hierarchy) and WDM based optical technologies. A SONET signal (i.e. such as STS-48, meaning 48 synchronous transport streams) is typically composed of multiple STS-1's which are assigned to various resources or clients, with the greater the number of STS-1's representing increased bandwidth. Networks based on these technologies enable services, such as traditional private line services, which have the following characteristics:

Point-to-point connectivity with ubiquity of access;
Determinism, whereby bandwidth is 100% dedicated to the connection at all times using time domain multiplexing;
Isolation, whereby individual services have fully dedicated and separated resources;
Static, whereby connections are made on a medium to long time frame basis;
Symmetric, whereby both the outbound and inbound paths have the same bandwidth quanta; and,
Non-dynamic, whereby the bandwidth quanta are constant over the life of the connection.

Protection mechanisms, for providing alternate transport paths in the event of a failure of a working transport path, are normally achieved within a WAN transport network by providing redundancy for services of fixed bandwidth. These known protection mechanisms include, for SONET, UPSR (a path switched mechanism), BLSR (a line switched mechanism), Linear 1+1, Linear 1:1 and Linear 1:N and, for wavelengths, O-BLSR, O-UPSR, 1+1 wavelength switching and 1+1 line switching. Disadvantageously, however, these known protection mechanisms utilize substantial redundancy. For the BLSR and 1+1 APS line protection mechanisms and the UPSR path protection mechanism twice the network bandwidth is reserved for all service traffic (i.e. to provide the active path and the restoral path). Thus, on using these existing protection mechanisms, service providers are limited to providing either network survivability, at the cost of wasting half of the network bandwidth for protection, or full usage of the network bandwidth at the cost of no protection. The "extra traffic" 1:1 line protection mechanism differs from 1+1 line protection in that the protection bandwidth is made available for use on a "best efforts" basis such that when a network failure occurs, the best effort traffic is dropped to allow the protected traffic access to the available resources. For 1:N line protection a single network path is used as the restoration path for N active channels. Thus, this protection mechanism also uses less than twice the operating bandwidth but the bandwidth needed to provide protection remains undesirably high and, moreover, multiple failures occurring simultaneously may not result in enough bandwidth to allow protection to occur.

More recently, a new class of data service has emerged which relies upon an on-going reallocation of bandwidth (i.e. STS-1's) amongst the clients by means of WAN networking devices within the link layer, examples of such services being high speed GbE, Fibre Channel and HDTV services. This reallocation of bandwidth can be accomplished on an in-service basis, with no perceived interruption in the data communications service by the clients. Although this new service class, which is essentially packet-based, holds some of the same characteristics as the foregoing traditional services and remains well served by 100% deterministic TDM or WDM networks, it has characteristics which are the opposite of traditional services, in particular, flexible bandwidth. This new class of data services is point-to-point in nature, deterministic and isolated, like the foregoing traditional services, but is different in that: (i) it is non-symmetric (ingress and egress traffic are generally unequal); (ii) it is dynamic (connection bandwidth varies over the life of the connection in response to non-static service loads); and, (iii) it is packet-based, such that the application can, in principle, make use of semi-arbitrary transport bandwidths by using flow control mechanisms which guarantee packet delivery or by using higher level protocols which resend any lost packets.

For this new class of data service, there is a need for means to provide different levels of protection for different service paths. In addition, there is a need for a protection switching mechanism that allows full network resource usage during normal operation while at the same time allowing for all services to be protected under failure conditions.

SUMMARY OF THE INVENTION

The invention herein provides service path protection for the aforesaid new class of data services on the basis that since these services are essentially packet-based it is possible to use reduced transport bandwidth when providing service protection. Specifically, transport bandwidth used to transport services, in normal operation, is made available as a shared protection resource as and when needed. In essence, therefore, the invention provides "M:N" protection whereby the ratios of pre- and post-protection invocation bandwidths, for each service, can be freely adjusted as desired.

In accordance with the invention there is provided a method for providing service protection to service paths transporting client data packet streams received from a plurality of packet-based client interfaces over a TDM or WDM network. The service paths are assigned to the data packet streams on a per-client basis. The network comprises a plurality of nodes and, at each node thereof, a plurality of network interfaces for configuring data frames comprising client data packet streams for transport from and to the network. Each client-based service path is defined by a selectable working path when service protection has not been initiated for that service path and each working path comprises a selectable bandwidth and at least one network interface associated therewith. Selectable portions of the bandwidth of a working path are designated as unpreemptable and/or preemptable. The preemptable portions of working path bandwidths are made available for protection preemption by different working paths. A protection path is assigned to each service path which is desired to be provided service protection whereby each protection path comprises a selectable bandwidth and at least one network interface which is distinct from the network interface associated with the working path for the service path. The protection path bandwidth comprises preemptable bandwidth portion(s) of working path(s) defining a different service path(s) and/or unused bandwidth of the network. In response to a protection switch request configured for initiating service protection for a protection-designated service path, the protection-designated service path is switched so that it is defined by the protection path assigned to it. Preemptable bandwidth portion(s) of the different client-based service path(s) is (are) thereby preempted for use by the protection-designated service path and lost for use by the different client-based service path(s).

Preferably, where a service paths is selected to be unprotected the working path bandwidth for such unprotected service path is designated unpreemptable. The protection path bandwidth preferably consists of one or more of the preemptable portions of working path bandwidth(s) defining different client-based service path(s). The protection path bandwidth may be selected to be less than or equal to the working path for the service path.

The service path may be unidirectional or bidirectional. Where the service path is bidirectional the network comprises receive and transmit nodes, each node comprising a network interface, and the switching is performed at each of the receive and transmit nodes of the service path. The protection switch request is preferably received by the receive node of the service path. The service path may comprise asymmetric bandwidth whereby the bandwidth in one direction of the service path differing from the bandwidth in the opposite direction.

In one embodiment of the invention the network is a SONET network and each service path bandwidth is comprised of a selectable number of STS-1's.

The working path bandwidths are preferably selected on a dynamic basis in response to network bandwidth available at a given point in time, whereby use of the network bandwidth for the working paths is maximized.

In accordance with another aspect of the invention there is provided a service path protection apparatus for providing service protection to selectable client-based service paths transporting client data packet streams over a TDM or WDM network. Each service path is defined by a working path when subject to normal conditions but, when subject to protection conditions, is defined by a protection path. Each working path is defined by a selectable bandwidth associated with a network interface. A bandwidth allocation controller is configured for designating selectable portion(s) of the bandwidth of a working path for a protected service path as unpreemptable and/or preemptable, the preemptable portion(s) being available for protection preemption by a different working path. A protection path is assigned to each protected service path, each protection path comprising a selectable bandwidth associated with a network interface which is distinct from the network interface associated with the working path for that protected service path. The protection path bandwidth comprises bandwidth preemptable portion(s) of working path(s) for different service path(s) and/or unused network bandwidth. A service path protection switch is operable in response to a protection switch request, the protection switch being configured for switching the protected service path so that it is defined by the protection path assigned to it. The preemptable bandwidth portion of the different service path is thereby preempted for use by the protected service path and lost for use by the different service path.

Preferably, the bandwidth allocation controller is configured for designating selectable bandwidth portions of the service paths as being either protected or unprotected, wherein unprotected bandwidth portions are designated as unpreemptable.

BRIEF DESCRIPTION OF THE DRAWINGS

Reference will now be made to the accompanying drawings which show, by way of example, a preferred embodiment of the present invention.

DETAILED DESCRIPTION OF THE ILLUSTRATED PREFERRED EMBODIMENT

Figure 1A:
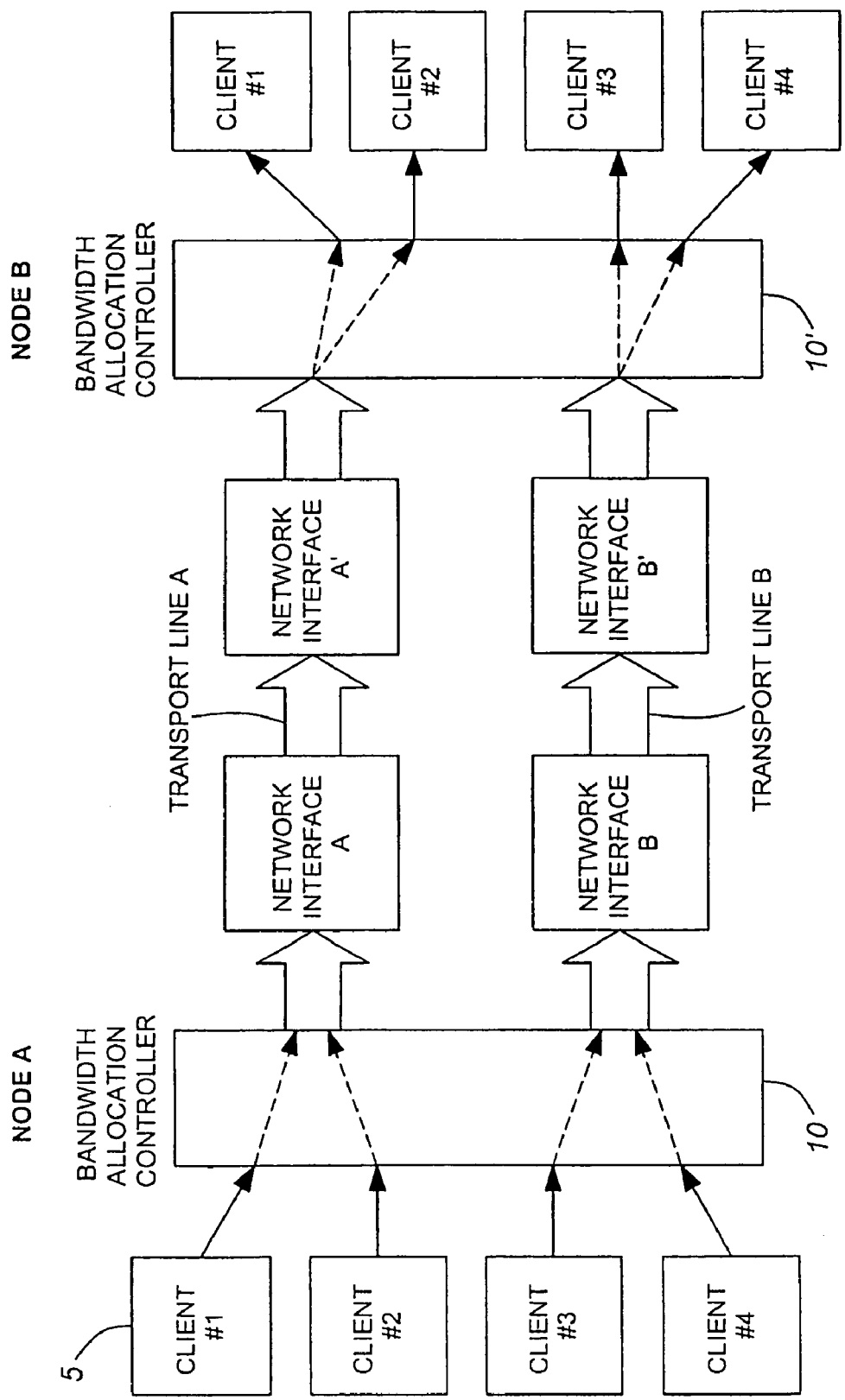
FIGS. 1(*a*), (*b*) and (*c*) illustrate a working path bandwidth allocation for four clients (data services) for transmission over two transport lines (A and B), wherein FIG. 1(*a*) is a block diagram of the network showing the working path bandwidth allocation established by a bandwidth allocation controller, FIG. 1(*b*) is a table showing the assignment of data transport frames (i.e. SONET frames) for the working paths (for clients 1 and 2) transported by network interface A to network line A and FIG. 1(*c*) is a table showing the assignment of data transport frames (i.e. SONET frames) for the working paths (for clients 3 and 4) transported by network interface B to network line B.

In accordance with the invention a method and apparatus are provided for adjusting service path bandwidth in a TDM or WDM network in response to available network bandwidth on a per-service (i.e. per-client) basis. Accordingly, the method and apparatus allow a network provider to utilize all bandwidth in the network for services under normal conditions, while still providing protection services. Advantageously, the network may be configured for different levels of protection on a service path basis.

The term "service path" used herein means a collection of bandwidth units assigned to a client interface and used to transport a data service. In a SONET transport network the service path bandwidth units are STS-1s, the number of which must not exceed the available line rate. Alternatively, the bandwidth unit of a WDM transport network could be wavelength based. A preferred embodiment of the invention described herein is configured for a SONET transport network and, accordingly, the following examples contemplate the use of a SONET network; however, it is to be understood that the invention is not limited to any particular TDM or WDM network configuration and is applicable to both TDM and WDM networks.

The bandwidth units (STS-1s) allocated to a particular data service carry the data for that service from one SONET network element to another. Since the allocation of bandwidth units to any one service path (client) may follow any configuration, as determined by a bandwidth allocation controller, the bandwidth units need not be contiguous. Moreover, an individual service path can be composed of multiple grades of bandwidth and can be unidirectional or bidirectional (in which case bandwidth assignment is asymmetric in that the number of bandwidth units used in one direction does not have to equal the amount of bandwidth used in the other direction).

Different service protection grades for each service path may be configured and defined as desired. Examples of different configurations include the following:
1. Protected: Guarantees protection on a single failure to that path.
2. Unprotected: Does not protect the path if a failure occurs along the path (and, preferably, service provided by the path will not be preempted if a failure occurs on another path).
3. Preemptable: Service provided by the path may be preempted if a failure occurs on another path and is not protected.

The bandwidth of a service path is configured by a bandwidth allocation controller 10 by means of software, the operation and algorithms of which are described in the following with reference to FIGS. 1(a), (b) and (c) and FIGS. 2(a) and (b). A user assigns a number of frames (e.g. STS-1s) of a specific network interface (e.g. SONET), such as network interface A in FIG. 1(a), to a data packet stream from a client interface (e.g. Gigabit Ethernet or Fiber Channel), such as client interface 5 in FIG. 1(a). This is designated as the "working" path for the assigned client interface 5 and the number of frames assigned cannot exceed the number of frames available on network interface A to which that client is assigned. The number of frames allocated to a client's working path determines the bandwidth for that working path (e.g. the greater the number of STS-1s allocated to a client service path the greater the bandwidth of that service path). Optionally, the user may specify exactly which frames are assigned. For all unidirectional client interfaces the assignment is done explicitly for each transport direction (i.e. transmit and receive). Under normal conditions (i.e. when service protection conditions have not been initiated for the working path) the working path and the service path are one and the same.

Of the frames allocated to a client any (or all) may be designated as a protected frame and the number of protected frames for each client are then made available on an alternate network interface, such as network interface B in FIG. 1(a). This alternate network interface (e.g. network interface B) is physically distinct from the network interface assigned to the working path (e.g. network interface A). These frames, made available on the alternate network interface, are designated as the protection path for the client. Optionally, the user may specify exactly which frames are assigned for the protection path. A bandwidth allocation controller 10 maintains the frame allocation for the protection path in memory. When a failure occurs on the working path the bandwidth allocation controller 10 switches the working path frames to the protection path and under these protections conditions the service path becomes the protection path.

Each of the frames assigned to a working path for a client is designated as either preemptable or unpreemptable by the bandwidth allocation device 10. "Preemptable" frames may be assigned to a protection path of a different client such that if a failure occurs on such different client's working path, the frames designated as preemptable may be used by such different client (in which case, during the time the protection condition exists, use of these frames would be lost to the client which normally has use of these frames as part of its working path). The number of frames designated as preemptable or unpreemptable is set by the user and the user also designates which frames these are. In an alternative embodiment, however, the frames to be designated may be determined by software based on which frames are unused (i.e. on the basis of the bandwidth which is available at a given point in time).

The tables of FIGS. 1(b) and (c) show the allocation of data frames (e.g. SONET frames) for working paths of two distinct network interfaces A and B, respectively, this allocation being maintained in memory for use by the bandwidth allocation controller 10. For each table, one row represents one frame (numbering 1–12 in the examples provided by these tables) and one column is provided for each of the frame designators "unpreemptable", "preemptable" and "protected" which serve to identify the type of frame. Each entry in each table (i.e. the number, if any, appearing in a box of a table) identifies the specific client interface, being one of clients 1–4 as shown in FIG. 1(a), assigned to that particular type of frame (designator). The final columns of the tables of FIGS. 1(b) and (c), headed "BW Allocation", identify the working path set-up of the bandwidth allocation controller 10 for network interfaces A and B, respectively. As shown in FIG. 1(a) and specified in the tables of FIGS. 1(b) and (c), client 1 is assigned frame nos. 1–6 of network interface A, client 2 is assigned frame nos. 7–12 of network interface A, client 3 is assigned frame nos. 1–6 of network interface B and client 4 is assigned frame nos. 7–12 of network interface B. FIG. 1(b) also shows that frames 4–6 and 10–12 of interface A will be used by clients 3 and 4, respectively, when protection is required for those clients. Similarly, FIG. 1(c) shows that frames 4–6 and 10–12 of interface B will be used by clients 1 and 2, respectively, when protection is required for those clients.

Protection is provided by the bandwidth allocation controller 10 as follows. First, the working unpreemptable bandwidth (i.e. frames) that are to carry the service during normal operating conditions is configured. Then the protection bandwidth is configured for a different transport line so that, when protection switching occurs, that other line will carry the service. The protection bandwidth is selectable, as desired, and as shown in FIGS. 1(b) and (c) may be equal to or less than the working bandwidth (in these Figures only three frames for each of the six frames assigned to the working path for a client are assigned a protection path). Lastly, the preemptable bandwidth (which is also used to carry the service for the client assigned to it during normal operating conditions) is configured and this preemptable bandwidth is released to other assigned service(s) when they require protection. For example, as shown in FIGS. 1(b) and (c), frames 4–6 on network interface A assigned to client 1's working path are designated as protected bandwidth and the protection path assigned to these frames is comprised of frames 4–6 on network interface B assigned to client 3's working path. Thus, frames 4–6 of client 3's working path are designated as preemptable. Frame nos. 1–3 of client 1's working path are not protected and are designated unpreemptable. Each service path is configured with one, two or all three types of bandwidth as aforesaid (but it is to be understood that protection bandwidth cannot exist on its own).

Figure 2A:
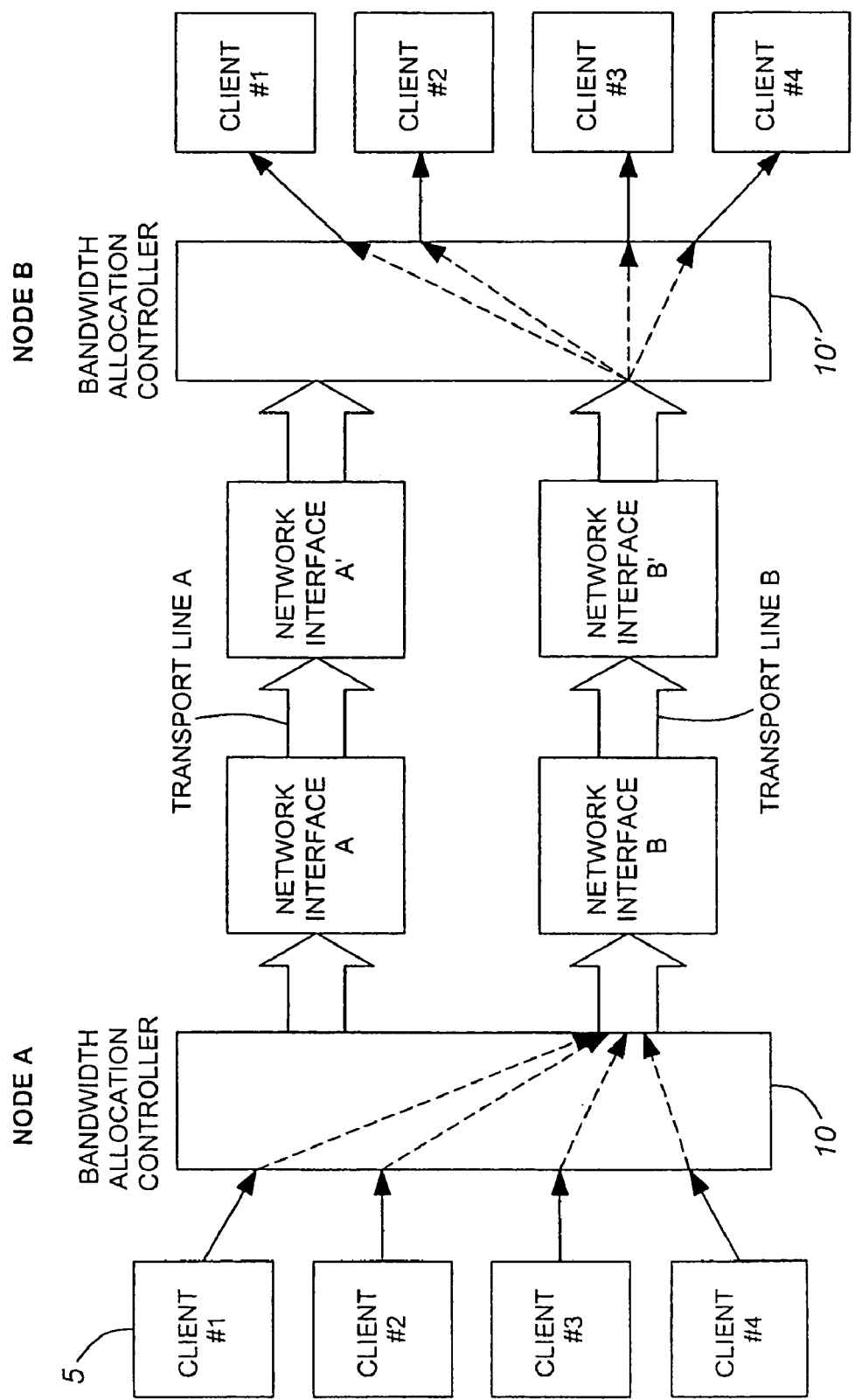
FIGS. 2(*a*) and (*b*) illustrate a protection path bandwidth allocation and implementation for the four clients (data services) of the network of FIG. 1 when a failure occurs on line A, wherein FIG. 2(*a*) is a block diagram of the network showing the protection paths for clients 1 and 2 on line B and FIG. 2(*b*) is a table showing an assignment of data transport frames (i.e. SONET frames) for each of clients 1–4 transported by line B under protection conditions providing protection to the service paths for clients 1 and 2.

FIGS. 2(a) and (b) illustrate the implementation of a protection service path when a failure occurs on line A of the network of FIG. 1(a). As shown, the bandwidth allocation controller 10 is reset so that each of clients 1 and 2 are switched to transport line B when a failure occurs on line A. Protection is provided to clients 1 and 2 by providing them with unused bandwidth of the network (if any such unused bandwidth is available) and/or, as needed, with the preemptable bandwidth of clients 3 and 4 (which reduces the bandwidth provided to clients 3 and 4). For the example shown by FIGS. 2(a) and (b), each client is assigned three frames when all protection paths have been initiated and the reduced (preempted) number of frames represents one-half of the bandwidth assigned to the clients' working paths under normal conditions (i.e. when protection is not needed). The preemptable bandwidth portion of the protection path (i.e. the frames designated as preemptable) is, under protection conditions, preempted for use by the protected client service path and lost for use by the different client service path whose working path includes it.

Service path protection is provided by the bandwidth allocation controller 10 when a transport line fault is detected and a switch request initiates a network protection switch. Protection is carried out at both ends of a service path whereby the protection bandwidth allocation for the path is identified and processed at both the receive and transmit nodes (e.g. nodes A and B in FIGS. 1(a), 2(a) and 3). A protection switch is initiated by a receive node of a service path (following receipt of a switch request) and is not considered complete until both the receive and transmit nodes have successfully completed the required protection bandwidth reconfiguration for the network interface(s) assigned to protect the service working path(s) on which the fault occurred.

Figure 3:
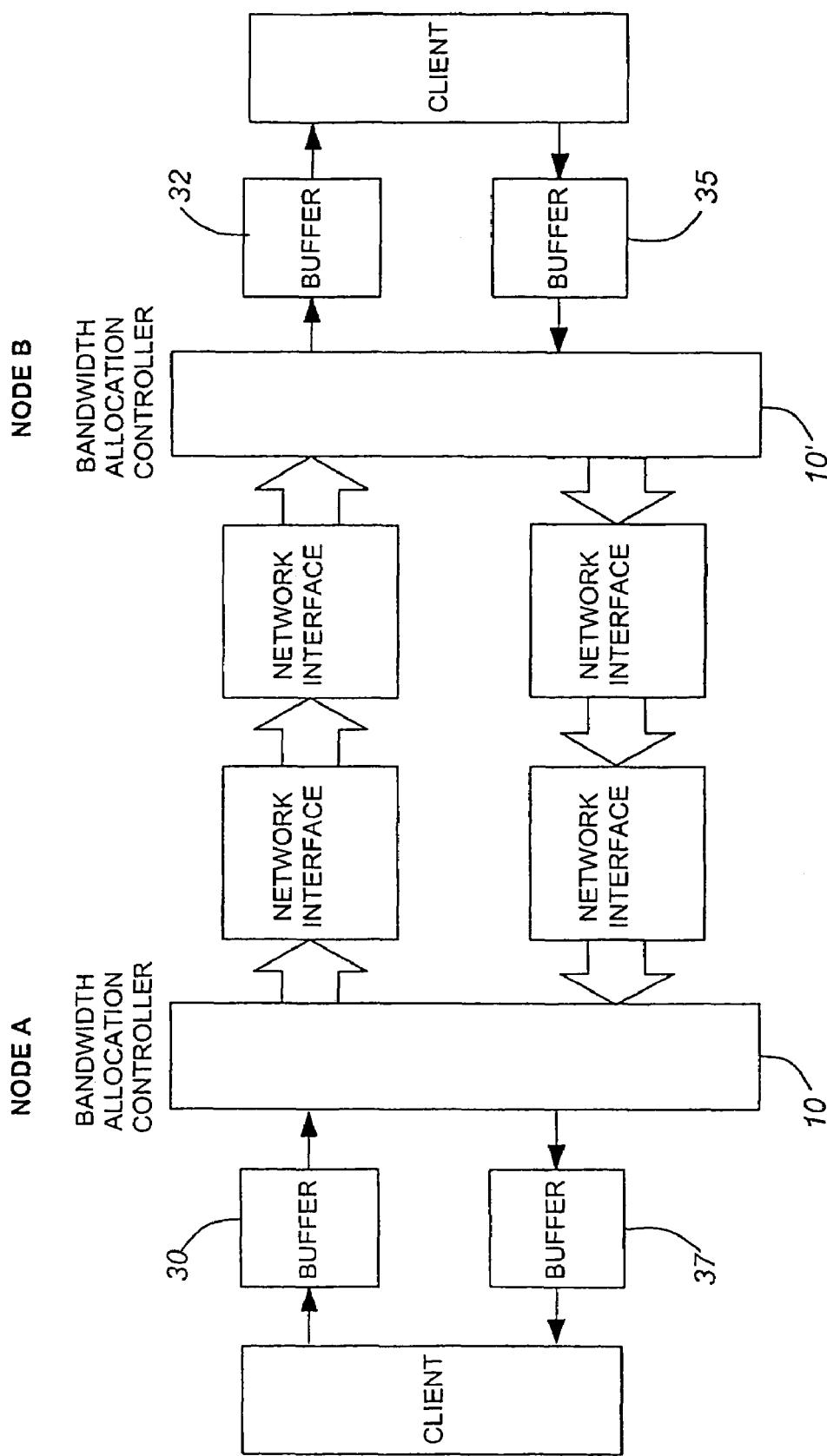
FIG. 3 is block diagram of a bidirectional network illustrating both the transmit and receive service paths for one transport line (only) between network nodes A and B; and, FIG. 4 is a state diagram illustrating the operations performed by a service path protection finite state machine (FSM) which determines how a bandwidth allocation controller is to be configured at each node (i.e. each of nodes A and B in FIG. 3) of a protected network in accordance with the invention.

If the service path is bi-directional, as illustrated by FIG. 3, both the receive and the transmit directions must be successfully switched at both nodes before the switch is considered complete. With reference to FIG. 3, the following steps are performed to complete a service path protection switch for one transport line when a switch request is received at node A:

(a) At node A, the forwarding of packets to node B is stopped and all packets received from the affected clients (those which are to be provided protection by this transport line) are buffered in a buffer 30, and a message is sent to node B to initiate a switch;

(b) At node B, upon receipt of the message to initiate a switch, transmission of packets to the affected clients is halted (i.e. idle frames are sent) by buffer 32, the forwarding of packets to node A is stopped, all packets received from the affected clients are buffered in a buffer 35, and a message is sent to node A to acknowledge that the switch has been initiated;

(c) At node A, upon receipt of the message acknowledging the switch initiation, transmission of packets to the affected clients is halted (i.e. idle frames are sent) by buffer 37, the bandwidth allocation controller 10 is configured to use the protection bandwidth configuration associated with the affected clients for this transport line and a switch request message is sent to node B;

(d) At node B, upon receipt of the switch request message the bandwidth allocation controller 10' is configured to use the protection bandwidth configuration associated with the affected clients for this transport line, transmission of packets to the affected clients is resumed (i.e unnecessary idle frames are no longer sent) by buffer 32, forwarding of packets to Node A is resumed by buffer 35 and a message is sent to Node A acknowledging the switch request;

(e) At node A, upon receipt of the message acknowledging the switch request, forwarding packets to Node B is resumed by buffer 30 and transmissions of packets to the affected clients is resumed by buffer 37.

Figure 4:
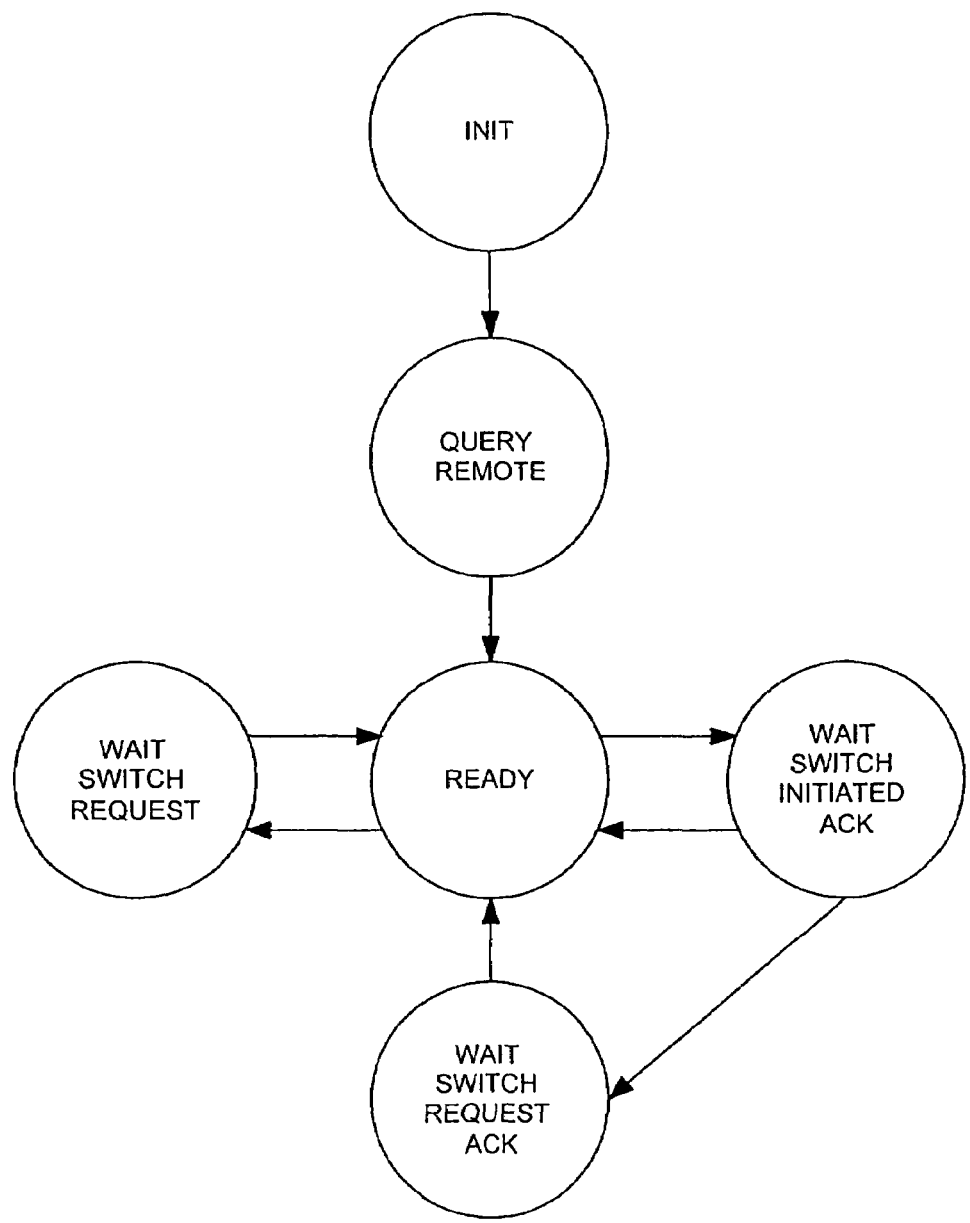

FIG. 4 is a state diagram for a finite state machine (FSM) associated with each protected service path. This FSM runs on a processor (i.e. is implemented by software) and the outputs/actions performed by the FSM are those described above (i.e. steps (a)–(e)) including telling a bandwidth allocation controller (i.e. controller 10, 10' at nodes A and B, respectively, of FIG. 3) how to configure itself. The states shown in FIG. 4 are described in the following:

in it. Refers to the initial start-up state, whereby the FSM waits to be told that it is okay to proceed.

Query Remote: Synchronize data with the remote node(s).

Ready State: Ready to handle any switch request.

Wait Switch Initiated Ack State: Waiting for the switch initiated acknowledgement message.

Wait Switch Request Ack State: Waiting for the switch request acknowledgement message.

Wait Switch Request State: Waiting for the switch request message.

Accordingly, the present invention enables service providers to use all available bandwidth while still providing protection, for those services that require it, under network failure conditions. Furthermore, through appropriate selection of bandwidth allocation, the degree to which services are assigned bandwidth under failure conditions may be tailored to meet the needs of a particular client. Thus, service providers can use the apparatus and method of the invention to obtain revenues based on the level of protection that is provided (e.g. a service path that requires the same bandwidth during a network failure may be designated a high level of protection for revenue purposes). Further, since the invention is suitable for both SONET/SDH and optical technologies, it allows for an intermingling of legacy protection mechanisms with the configurable bandwidth protection mechanism of the invention. This advantageously enables an optimization of protection for different service types.

The individual electronic and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. A method for providing service protection to service paths transporting client data packet streams received from a plurality of packet-based client interfaces over a TDM or WDM network, said service paths being assigned to said data packet streams on a per-client basis, said network comprising a plurality of nodes and, at each node thereof, a plurality of network interfaces for configuring data frames comprising client data packet streams for transport from and to said network, whereby each said client-based service path is defined by a selectable working path when said service protection has not been initiated for said service path, each said working path comprising a selectable bandwidth and at least one said network interface associated therewith, said method comprising:

(a) designating selectable portions of said bandwidths of said working paths as unpreemptable and/or preemptable, whereby said preemptable portions of said working path bandwidths are made available for protection preemption by different working paths;

(b) assigning a protection path to each said service path which is to be provided said service protection whereby each said protection path comprises a selectable bandwidth and at least one said network interface which is distinct from said network interface associated with said working path for said service path, whereby said protection path bandwidth comprises preemptable bandwidth portion(s) of working path(s) defining different service path(s) and/or unused network bandwidth;

(c) in response to a protection switch request configured for initiating said service protection for a protection-designated service path, switching said protection-designated service path to define said protection-designated service path by said protection path assigned thereto, whereby said preemptable bandwidth portion(s) of said different service path(s) is(are) preempted for use by said protection-designated service path and lost for use by said different client-based service path.

2. A method according to claim 1 whereby one or more unprotected service paths transport client data packet streams over said network and said working path bandwidth for each said unprotected service path is designated unpreemptable.

3. A method according to claim 1 whereby said protection path bandwidth consists of one or more said preemptable portions of said working path bandwidth(s) defining different said client-based service path(s).

4. A method according to claim 3 whereby said bandwidth of said protection path assigned to said service path is selected to be less than or equal to said working path for said service path.

5. A method according to claim 4 whereby said service paths are unidirectional.

6. A method according to claim 4 whereby said service paths are bidirectional and each said service path comprises receive and transmit nodes, each said node comprising one of said network interfaces, said switching being performed at each of said receive and transmit nodes of said service path.

7. A method according to claim 6 whereby said protection switch request is received by said receive node of said service path.

8. A method according to claim 7 whereby said bidirectional service path comprises asymmetric bandwidth, said bandwidth in one direction of said service path differing from said bandwidth in the opposite direction.

9. A method according to claim 8 whereby said network is a SONET network and each said bandwidth is comprised of a selectable number of STS-1s.

10. A method according to claim 9 comprising selecting said working path bandwidths on a dynamic basis in response to available network bandwidth to maximize use of said network bandwidth for said working paths.

11. A service path protection apparatus for providing service protection to selectable client-based service paths used for transporting client data packet streams over a TDM or WDM network, each said service path being defined by a working path under normal conditions and each said service path selected for protection being defined by a protection path when service protection has been initiated for said protected service path, each said working path being defined by a selectable bandwidth associated with a network interface, said apparatus comprising:

(a) a bandwidth allocation controller configured for:
(i) designating selectable portion(s) of said bandwidth of a working path for said protected service path as unpreemptable and/or preemptable, said preemptable portion(s) of said working path bandwidth being available for protection preemption by a different working path; and,
(ii) assigning a protection path to each protected service path, each said protection path comprising a selectable bandwidth associated with a network interface which is distinct from said network interface associated with said working path for said protected service path, whereby said protection path bandwidth comprises preemptable bandwidth portion(s) of working path(s) for different service path(s) and/or unused network bandwidth; and, (b) a service path protection switch operable in response to a protection switch request and configured for switching said protected service path to define said protected service path by said protection path assigned thereto, said preemptable bandwidth portion of said protection path being preempted for use by said protected service path and lost for use by said different service path.

12. The apparatus of claim 11 wherein said bandwidth allocation controller is configured for designating selectable bandwidth portion(s) of said working paths as protected or unprotected, wherein said unprotected bandwidth portion(s) is(are) designated unpreemptable.

13. An apparatus according to claim 12 wherein said protection path bandwidth consists of said preemptable portion(s) of said working path bandwidth(s) for different service path(s).

14. An apparatus according to claim 13 wherein said protection path bandwidth is selectable to be less than or equal to said working path for said service path.

15. An apparatus according to claim 14 wherein said service paths are unidirectional.

16. An apparatus according to claim 14 wherein said service paths are bidirectional, each said service path comprising one said protection apparatus at a receive node at one end of said service path and another said protection apparatus at a transmit node at the opposite end of said path, said service path protection switch being configured for communicating with said service path protection switch of said other apparatus to complete said switching.

17. An apparatus according to claim 16 whereby said bidirectional service paths comprise asymmetric bandwidth, said bandwidth in one direction of said service path differing from said bandwidth in the opposite direction.

18. An apparatus according to claim 17 wherein said network is a SONET network and each said bandwidth is comprised of a selectable number of STS-1s.

19. An apparatus according to claim 18 wherein said bandwidth allocation controller is configured for selecting said working path bandwidths on a dynamic basis in response to available network bandwidth at a given point in time, whereby use of said network bandwidth for said working paths is maximized.

* * * * *